United States Patent [19]
Ikegami

[11] Patent Number: 6,092,918
[45] Date of Patent: Jul. 25, 2000

[54] VEHICULAR HEADLAMP HAVING IMPROVED YIELD OF HIGH-BEAM LUMINOUS ENERGY

[75] Inventor: Toshiaki Ikegami, Shizuoka, Japan

[73] Assignee: Koito Manufacturing Co., Ltd., Tokyo, Japan

[21] Appl. No.: 09/185,008

[22] Filed: Nov. 4, 1998

[30] Foreign Application Priority Data

Nov. 11, 1997 [JP] Japan ................................. 9-325272

[51] Int. Cl.$^7$ ............................................. F21W 101/02
[52] U.S. Cl. ..................... 362/544; 362/543; 362/517
[58] Field of Search .................................. 362/518, 517, 362/519, 543, 544

[56] References Cited

U.S. PATENT DOCUMENTS

| 5,136,482 | 8/1992 | Urbschat | 362/517 |
|---|---|---|---|
| 5,190,368 | 3/1993 | Sekiguchi | 362/544 X |
| 5,353,203 | 10/1994 | Bertling et al. | 362/61 |
| 5,607,219 | 3/1997 | Brummel et al. | 362/517 X |
| 5,702,173 | 12/1997 | Kawamura | 362/544 X |
| 5,735,591 | 4/1998 | Ruckwied | 362/544 |
| 5,941,633 | 8/1999 | Saito et al. | 362/543 |

*Primary Examiner*—Laura K. Tso
*Attorney, Agent, or Firm*—Sughrue, Mion, Zinn, Macpeak & Seas, PLLC

[57] ABSTRACT

A vehicular headlamp provided with a reflector composed of a low-beam reflecting surface and a high-beam reflecting surface disposed closely adjacent vertically one another, which headlamp provides a high yield of high-beam luminous energy. The reflector is formed so that the focal distance of the lower, high-beam reflecting surface is less the focal distance of the upper, low-beam reflecting surface so as to increase the solid angle defined by the high-beam reflecting surface. Preferably, the rear end portion of the high-beam reflecting surface is displaced rearward of a rear end portion of the low-beam reflecting surface, thus further increasing the solid angle of the high-beam reflecting surface.

5 Claims, 4 Drawing Sheets

VEHICULAR HEADLAMP HAVING IMPROVED YIELD OF HIGH-BEAM LUMINOUS ENERGY

BACKGROUND OF THE INVENTION

The present invention relates to a vehicular headlamp provided with a reflector having a low-beam reflecting surface and a high-beam reflecting surface disposed closely adjacent one another vertically.

Generally, four-beam headlamps for a motor vehicle provided with separate low- and high-beam reflectors are well known. The low- and high-beam reflectors may be disposed either vertically or laterally adjacent one another.

A headlamp provided with a reflector formed by integrating the low- and high-beam reflectors has also been disclosed. In this case, the reflector has a structure in which the low-beam reflecting surface and a high-beam reflecting surface are disposed closely adjacent one another. Examples of such headlamps are disclosed in U.S. Pat. Nos. 5,353,203 and 5,702,174.

In order to improve the driver's view at night, it is required to provide a high yield of luminous energy of not only the low beam but also the high beam. Particularly, the driver of a vehicle such as a truck, RV, or large-size passenger car may be likely to drive long distances or drive on country roads at night in situations where the high beam is kept ON for long periods. In such a case, it is especially important to obtain a sufficiently high yield of luminous energy.

In the conventional vehicular headlamp provided with a reflector having low- and high-beam reflecting surfaces disposed closely adjacent vertically, the focal distances of both reflecting surfaces are the same. It has been found, however, that such an arrangement may fail to establish a sufficiently great solid angle of the high-beam reflecting surface, resulting in an insufficient yield of the high-beam luminous energy.

SUMMARY OF THE INVENTION

Accordingly it is an object of the present invention to solve the foregoing problem by providing a vehicular headlamp having a reflector including a low-beam reflecting surface and a high-beam reflecting surface disposed closly adjacent one another vertically and which provides a sufficiently high yield of high-beam luminous energy.

The aforementioned object is realized by forming the high-beam reflecting surface in such a headlamp with a focal distance which is less than that of the low-beam reflecting surface.

That is, according to the present invention a vehicular headlamp is provided with a reflector having a low-beam reflecting surface and a high-beam reflecting surface disposed closely adjacent one another vertically, where the focal distance of the high-beam reflecting surface is less than the focal distance of the low-beam reflecting surface. Particularly, the focal distance of the high-beam reflecting surface is less than 0.9 times the focal distance of the low-beam reflecting surface.

In the aforementioned structure, either the low-beam reflecting surface or the high-beam reflecting surface may be on top.

Each of the reflecting surfaces may be formed as a paraboloid of revolution having no function for controlling the luminous intensity distribution. Otherwise, each reflecting surface may be formed as a stepped reflecting surface or a free-form reflecting surface so as to provide the capability of better controlling the luminous intensity distribution. In the former case, the focal distance of the paraboloid of revolution constituting the reflecting surface will be taken as the focal distance. In the latter case, the focal distance of the paraboloid of revolution which forms the reference for constituting the reflecting surface will be taken as the focal distance.

The light source bulb fitted to the low-beam reflecting surface may be arranged to be turned ON simultaneously with the light source bulb for the high-beam reflecting surface. As a matter of course, the two bulbs may be turned ON independently.

The focal distance of the high-beam reflecting surface may be set to an arbitrary value so long as it is set to a value smaller than the focal distance of the low-beam reflecting surface. For example, the focal distance of the high-beam reflecting surface may be set to 0.9 or less than the focal distance of the low-beam reflecting surface.

The headlamp may be formed as a unit-movable type in which the reflector is fixed to the lens, or a reflector-movable type in which the reflector is housed in a space defined by the lens and lamp body and is adjustable in position within this space.

As described above, the vehicular headlamp according to the present invention is provided with a reflector having low- and high-beam reflecting surfaces disposed closely adjacent vertically. The focal distance of the high-beam reflecting surface is made smaller than that of the low-beam reflecting surface, thus increasing the solid angle of the high-beam reflecting surface.

With the inventive structure, a headlamp for a motor is obtained which provides a sufficiently high yield of high beam luminous energy. As a result, the driver's view for night driving is improved.

In the above-described structure, the rear end portions of the two reflecting surfaces may be vertically aligned. If, however, the rear end portion of the high-beam reflecting surface is located to the rear of the rear end portion of the low-beam reflecting surface, the solid angle of the high-beam reflecting surface can be further increased. Moreover, in such a case the width of the opening at the front end of both reflecting surfaces can be made substantially the same, thus improving the appearance of the lamp assembly.

In the foregoing case, if the high-beam reflecting surface is located on the bottom, that is, below the low-beam reflecting surface, the rear end portion of the lower reflecting surface is located to the rear of the rear end portion of the upper reflecting surface. The location where each bulb is inserted into its mounting opening in the respective reflecting surface can be readily observed from the upper side of the lamp assembly, thus facilitating bulb replacement.

In addition to the above-described difference in the focal distance between the two reflecting surfaces, a stepped portion may be formed at the boundary therebetween. If the amount of rearward displacement of the rear end portion of the high-beam reflecting surface from that of the low-beam reflecting surface is set such that the stepped portion formed at the boundary is directed downward over the entire extent of the reflectors, the light projected from the light source bulb for the low-beam reflecting surface is prevented from being reflected upward on the stepped portion, thus preventing generation of glare. Furthermore the stepped portion is arranged not to be observable when the lamp assembly is viewed from the upper front diagonal direction, thus improving the overall appearance of the lamp assembly.

DESCRIPTION OF THE PREFERRED EMBODIMENTS

Figure 1:
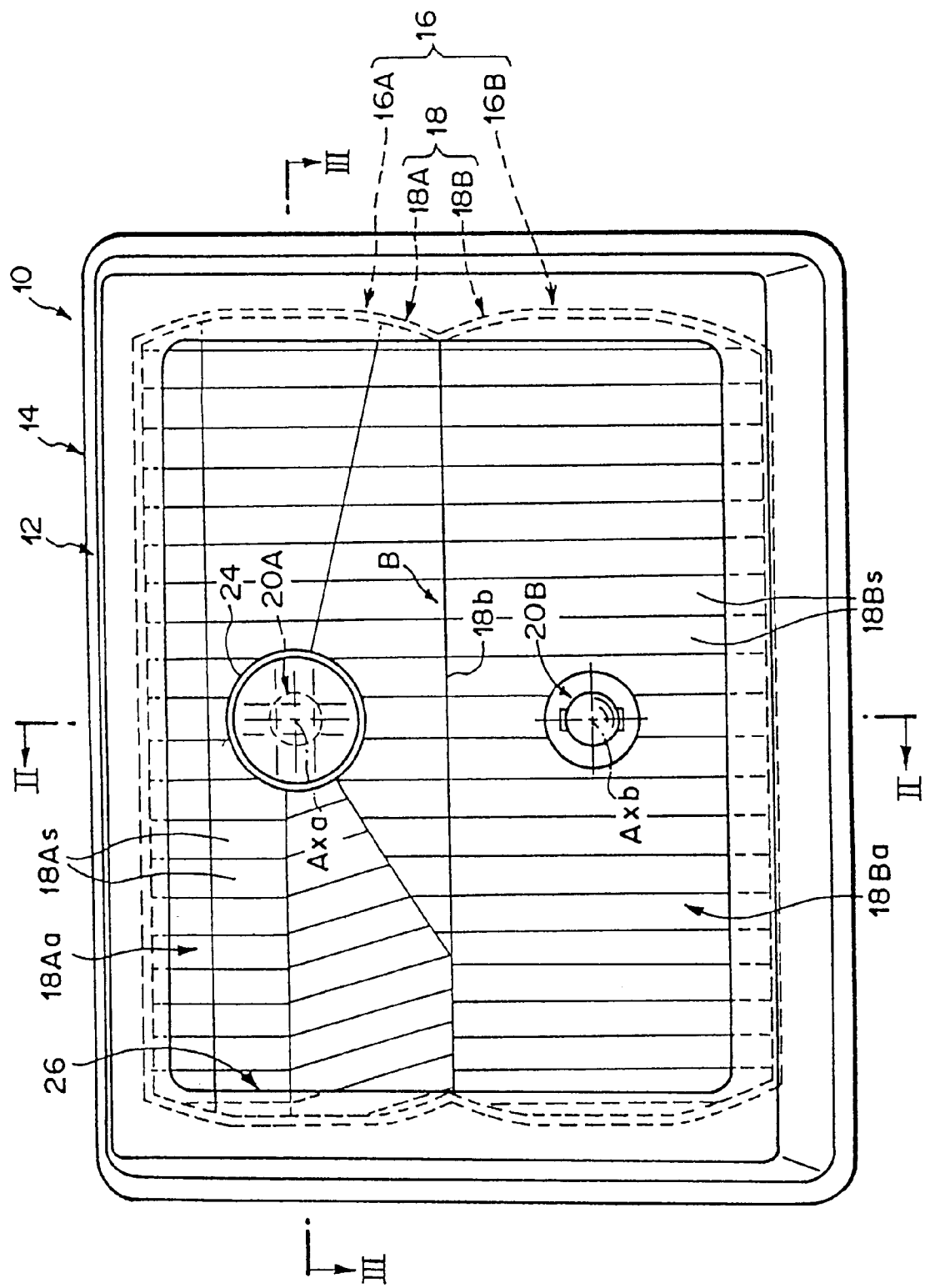
FIG. 1 is a front view showing a vehicular headlamp according to one embodiment of the present invention.

Preferred embodiments of the present invention will be described referring to the drawings.

Figure 2:
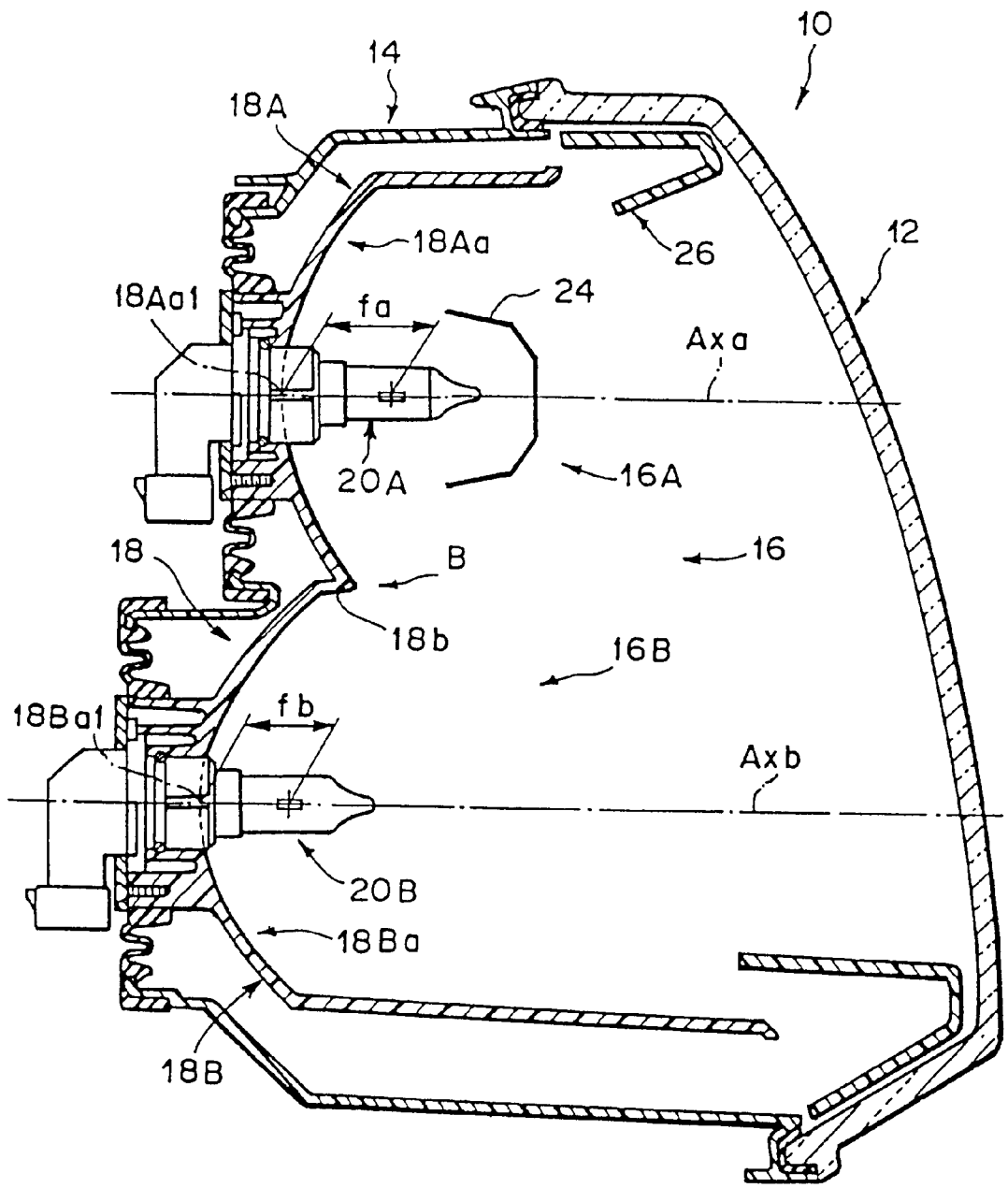
FIG. 2 is a cross-sectional view taken along line II—II in FIG. 1.
Figure 3:
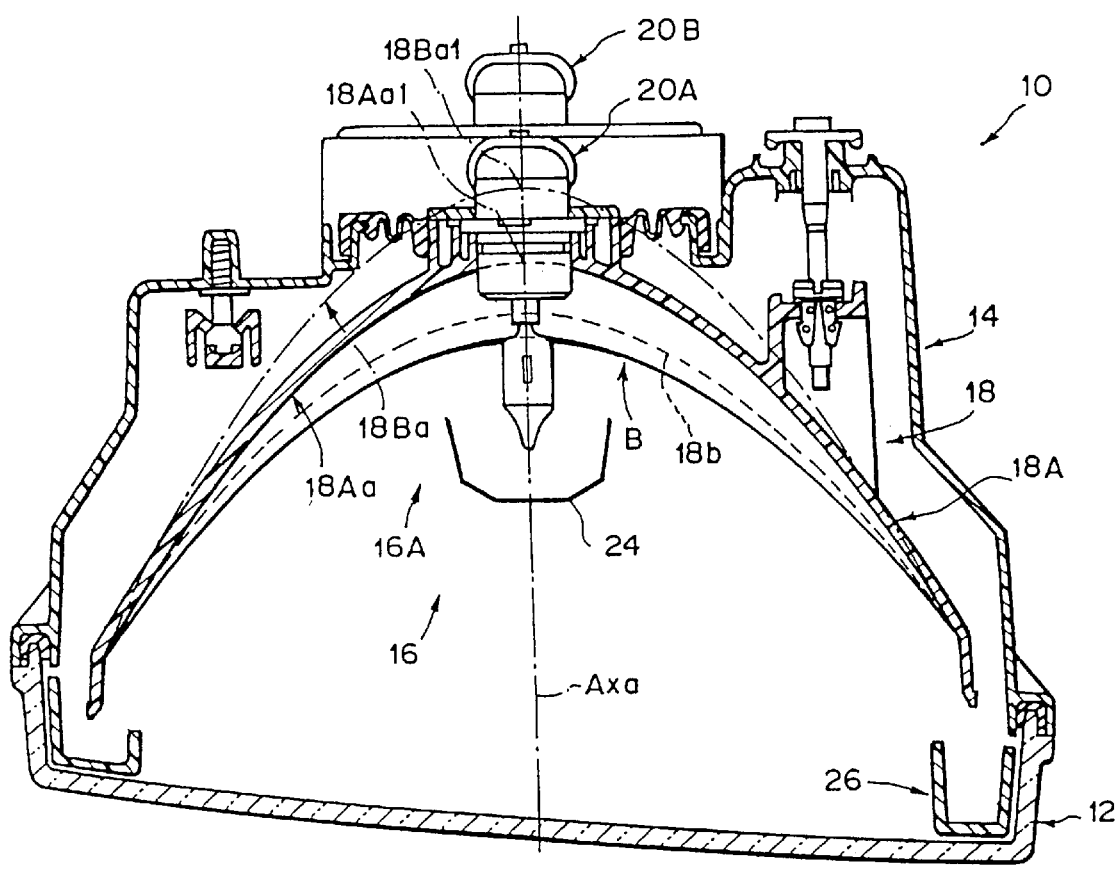
FIG. 3 is a cross-sectional view taken along line III—III in FIG. 1.

FIG. 1 is a front view of a vehicular headlamp constructed according to a preferred embodiment of the present invention. FIGS. 2 and 3 are cross-sectional views taken along lines II—II and III—III, respectively, in FIG. 1.

Referring to the drawings, a headlamp (lamp assembly) 10 for a motor vehicle of this embodiment is a four-beam type headlamp having an integrated reflector unit 16 having two reflector units 16A, 16B disposed at upper and lower stages, and which is mounted in a space defined by a lens 12 and a lamp body 14. The above-structured reflector unit 16 is mounted so as to be adjustable in position both vertically and laterally.

The lens 12 is a clear lens, so that the respective reflector units 16A, 16B are used for controlling the luminous intensity distribution. The upper reflector unit 16A constitutes a low-beam reflector unit and the lower reflector unit 16B constitutes a high-beam reflector unit. The luminous intensity distribution pattern of the low beam is formed by lighting just the upper reflector unit 16A, while the intensity distribution pattern of the high beam is formed by lighting both reflector units 16A, 16B simultaneously.

In the upper reflector unit 16A, a light source bulb 20A is inserted into a mounting hole formed in the rear portion of a upper reflector 18A having a transversely extending optical axis Axa. In the lower reflector unit 16B, a light source bulb 20B is inserted into a mounting hole in the rear portion of a lower reflector 18 having a transversely extending optical axis Axb. Each of the light source bulbs 20A, 20B is preferably a halogen bulb, for example, type numbers 9006 and 9005, respectively.

The reflectors 18A, 18B are formed as an integrated reflector 18 using an injection molding process. The reflecting surface 18A$a$ of the upper reflector 18A (i.e., the low-beam reflecting surface) and the reflecting surface 18B$a$ of the lower reflector 18B (i.e., the high-beam reflecting surface) are disposed closely adjacent vertically. Each of the reflecting surfaces 18A$a$, 18B$a$ is formed of a plurality of reflection surface elements 18A$s$, 18B$s$, each formed with respect to a reference surface in the form of a paraboloid of revolution around the optical axes Axa, Axb, respectively. The light beam projected from the light source bulb 20 can be subjected to diffused reflection or deflection reflection frontward on the reflecting surfaces 18A$a$ and 18B$a$.

The focal distance fa of the low-beam reflecting surface 18A$a$, i.e., the focal distance of the paraboloid of revolution as a reference surface, is not the same as the focal distance fb of the high-beam reflecting surface 18B$a$, i.e., the focal distance of the paraboloid of revolution as a reference surface, but is set so as to realize the relationships fa>fb. The focal distances fa, fb may be, for example, 30 mm and 25 mm, respectively.

The rear end portion 18B$a$1 of the high-beam reflecting surface 18B$a$ is located to the rear of the rear end portion 18A$a$1 of the low-beam reflecting surface 18A$a$. The amount of rearward displacement of the rear end portion 18B$a$1 from the rear end portion 18A$a$1 is set to a value such that the downward stepped portion 18$b$ is formed only at the boundary B between the two reflecting surfaces 18A$a$ and 18B$a$.

Figure 4:
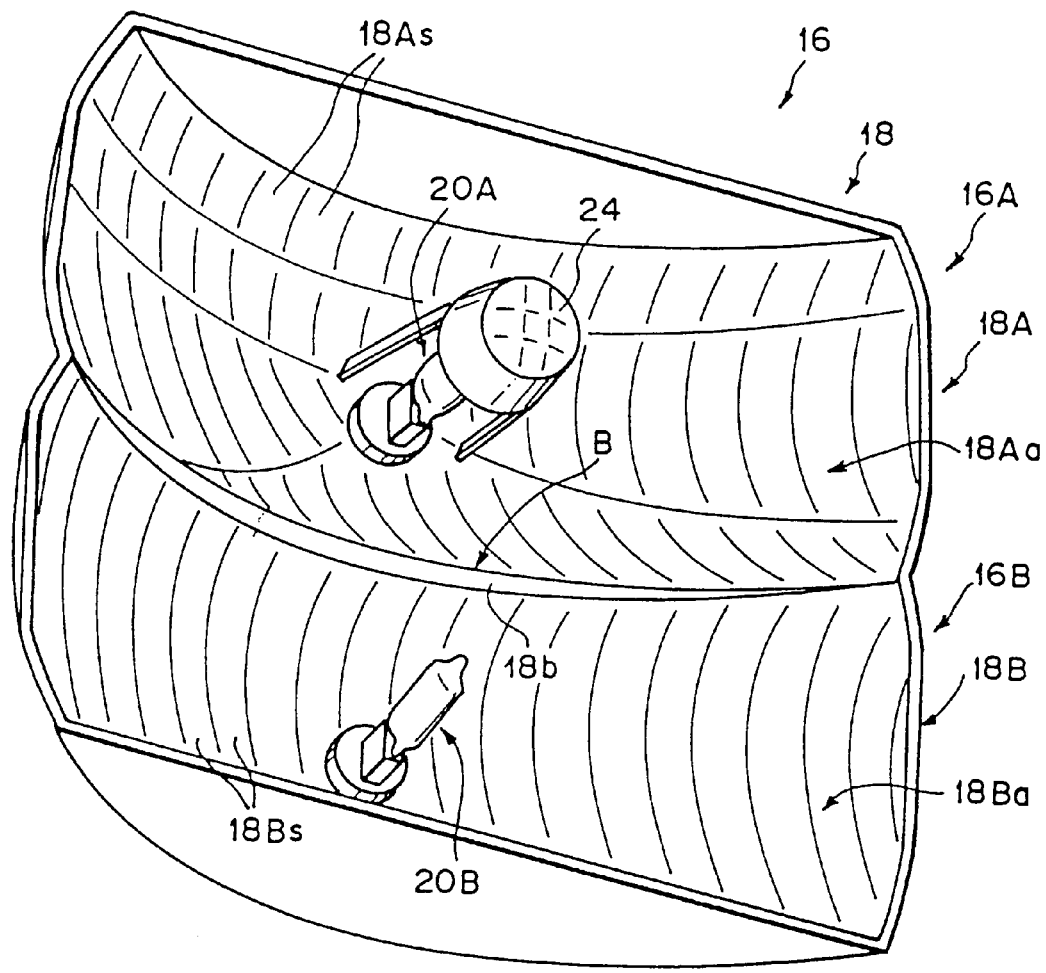
FIG. 4 is a perspective view, as observed from the lower side, of an integrated reflector unit of the above embodiment formed as a single part.

FIG. 4 is a schematic view of the integrated reflector unit 16, which is formed as a single member, viewed from the lower side thereof.

Referring to FIG. 4, the downward stepped portion 18$b$ is formed in a crescent shape with the width of each end at the boundary B tapering to zero. Such an arrangement can be accomplished by adjusting the amount of rearward displacement, for example, by making the amount of rearward displacement approximately 20 mm.

The upper reflector 18A is provided with a shade 24 for cutting direct light beams projected from the light source bulb 20 forward of the lamp assembly. An extension 26 is provided forward of the integrated reflector unit 16 along the periphery thereof.

As described in detail hereinabove, the headlamp of this embodiment is provided with the integrated reflector 18 composed of the low-beam reflecting surface 18A$a$ and the high-beam reflecting surface 18B$a$ disposed closely adjacent vertically. The focal distance fb of the high-beam reflecting surface 18B$a$ is made smaller than the focal distance fa of the low-beam reflecting surface 18A$a$ so as to increase the solid angle of the high-beam reflecting surface 18B$a$.

The vehicular headlamp of this embodiment, which is provided with a reflector composed of low- and high-beam reflecting surfaces disposed closely adjacent vertically, makes it possible to obtain a sufficiently high yield of high beam luminous energy, leading to an improved driver's view for nightime driving.

In the foregoing embodiment, the rear end portion 18B$a$1 of the high-beam reflecting surface 18B$a$ is located to the rear of the rear end portion 18A$a$1 of the low-beam reflecting surface 18A$a$, thus further increasing the solid angle of the high-beam reflecting surface 18B$a$. Additionally, the width of the openings at the front ends of both reflecting surfaces 18A$a$, 18B$a$ can be made the same, thus improving the appearance of the lamp assembly.

In this embodiment, as the high-beam reflecting surface 18B$a$ is located at the bottom, the rear end portion 18B$a$1 thereof is located to the rear of the rear end portion 18A$a$1 of the low-beam reflecting surface 18A$a$. As a result, the locations where the bulbs are inserted into the respective reflector units 16A, 16B can be readily observed from the upper side of the lamp assembly, which facilitates bulb replacement.

In this embodiment, the amount of rearward displacement of the rear end portion 18B$a$1 of the high-beam reflecting surface 18B$a$ from the rear end portion 18A$a$1 of the low-beam reflecting surface 18A$a$ is set such that a stepped portion 18$b$ formed at a boundary B is directed downward over the entire width of the reflector. This keeps the light beam projected from the light source bulb 20A for the low beam from being reflected upward on the stepped portion, thus preventing generation of glare. The stepped portion is arranged not to be visible from the upper front diagonal direction so as to improve the overall appearance of the headlamp.

What is claimed is:

1. A vehicular headlamp comprising: a reflector, said reflector comprising a low-beam reflecting surface, and a high-beam reflecting surface disposed closely adjacent vertically said low-beam reflecting surface, a focal distance of said high-beam reflecting surface being less than a focal distance of said low-beam reflecting surface; and a low-beam light source bulb mounted adjacent said low-beam reflecting surface and a high-beam light source bulb mounted adjacent said high-beam reflecting surface.

2. The vehicular headlamp according to claim 1, wherein said focal distance of said high-beam reflecting surface is less than 0.9 times said focal distance of said low-beam reflecting surface.

3. The vehicular headlamp according to claim 1, wherein a rear end portion of said high-beam reflecting surface is located rearward of a rear end portion of said low-beam reflecting surface.

4. The vehicular headlamp according to claim 3, wherein said high-beam reflecting surface is located below said low-beam reflecting surface.

5. The vehicular headlamp according to claim 4, wherein a stepped portion is formed at a boundary between said high-beam reflecting surface and said low-beam reflecting surface, said stepped portion being directed downward and extending along substantially the entire length of said boundary.

* * * * *